US008985776B2

(12) United States Patent
Benedix et al.

(10) Patent No.: US 8,985,776 B2
(45) Date of Patent: Mar. 24, 2015

(54) PROJECTION OBJECTIVE HAVING FOUR GROUPS FOR PROJECTING LIGHT ONTO A PROJECTION SURFACE AND A PROJECTOR INCLUDING THE PROJECTION OBJECTIVE

(75) Inventors: Guenther Benedix, Jena (DE); Gudrun Schroeter, Jena (DE); Gertrud Blei, Jena (DE); Rainer Fischer, Jena (DE); Eberhard Piehler, Jena-Nerkewitz (DE)

(73) Assignee: Sypro Optics GmbH (DE)

( * ) Notice: Subject to any disclaimer, the term of this patent is extended or adjusted under 35 U.S.C. 154(b) by 546 days.

(21) Appl. No.: 12/575,067

(22) Filed: Oct. 7, 2009

(65) Prior Publication Data

US 2010/0091249 A1    Apr. 15, 2010

(30) Foreign Application Priority Data

Oct. 10, 2008  (DE) .......................... 10 2008 051 252

(51) Int. Cl.
  *G02B 15/14* (2006.01)
  *G02B 9/34* (2006.01)
  *G02B 13/16* (2006.01)
  *G03B 21/00* (2006.01)
  *H04N 9/31* (2006.01)

(52) U.S. Cl.
  CPC ............... *G02B 13/16* (2013.01); *G03B 21/00* (2013.01); *H04N 9/317* (2013.01); *H04N 9/3197* (2013.01)
  USPC ............ 353/30; 359/680; 359/681; 359/682; 359/683; 359/684; 359/781; 359/782; 359/783

(58) Field of Classification Search
  USPC .......... 353/38, 101, 20, 30, 31; 359/680, 681, 359/682, 683, 684, 781, 782, 783
  See application file for complete search history.

(56) References Cited

U.S. PATENT DOCUMENTS

| 4,497,015 | A | * | 1/1985 | Konno et al. | 362/268 |
|---|---|---|---|---|---|
| 5,095,387 | A | * | 3/1992 | Horiuchi | 359/676 |
| 5,847,882 | A | * | 12/1998 | Nakayama | 359/684 |
| 6,545,817 | B2 | * | 4/2003 | Hirose | 359/683 |
| 6,870,689 | B2 | * | 3/2005 | Yoshida | 359/683 |
| 6,925,253 | B2 | * | 8/2005 | Miyatake | 396/79 |
| 7,390,098 | B2 | * | 6/2008 | Wada | 353/101 |
| 7,605,985 | B2 | * | 10/2009 | Nagahara et al. | 359/680 |
| 7,855,841 | B2 | * | 12/2010 | Kubota | 359/686 |
| 2003/0169510 | A1 | * | 9/2003 | Boku et al. | 359/687 |
| 2004/0109239 | A1 | * | 6/2004 | Yoshida | 359/678 |
| 2006/0061872 | A1 | * | 3/2006 | Yamasaki | 359/680 |
| 2006/0227302 | A1 | * | 10/2006 | Harbers et al. | 353/94 |
| 2008/0019017 | A1 | * | 1/2008 | Nishina | 359/684 |
| 2009/0141242 | A1 | * | 6/2009 | Silverstein et al. | 353/20 |
| 2010/0208358 | A1 | * | 8/2010 | Minefuji | 359/682 |

* cited by examiner

*Primary Examiner* — Sultan Chowdhury
*Assistant Examiner* — Bao-Luan Le
(74) *Attorney, Agent, or Firm* — Price Heneveld LLP

(57) ABSTRACT

A projector for projecting light onto a projection surface includes a first group (1) with a negative meniscus, a second group (2) with positive refractive power, a third group (3) with a single lens, a fourth group (4) with a lens with positive refractive power, and a field lens (5) with positive refractive power, such that the light passes through the projection objective from the fourth to the first group. In order to be provide a high image quality with a small number of optical components and the smallest dimensions, the projector is configured so the common focal width of the fourth group (4) and the field lens (5) is smaller than twice the image circle diameter (9) of the projection objective and the maximum free diameter (8) is smaller than the overall focal width, and in particular smaller than 0.8 times the overall focal width of the projection objective.

20 Claims, 4 Drawing Sheets

PROJECTION OBJECTIVE HAVING FOUR GROUPS FOR PROJECTING LIGHT ONTO A PROJECTION SURFACE AND A PROJECTOR INCLUDING THE PROJECTION OBJECTIVE

CLAIM OF PRIORITY

This application claims priority to German Patent Application No. 102008051252.4, filed Oct. 10, 2008, and commonly assigned to Sypro Optics GmbH.

FIELD OF THE INVENTION

The invention relates to a projection objective and more particularly to a projection objective providing a high image quality with a small number of optical components for projecting light onto a surface.

BACKGROUND OF THE INVENTION

Image projection systems which use reflective modulation fields as image transmitters and image onto projection screens or projection walls are known.

This type of projection system is described among other places in WO 2005/045507 A1. It comprises a Liquid Crystal on Silicon (LCOS) element, a projection lens arrangement and a wire grid in order to direct at least part of the light from the source to the LCOS element and to direct part of the light reflected by the LCOS element onto the projection lens arrangement. Moreover, a field lens and a quarter-wave plate are disposed optically between the LCOS element and the wire grid. By means of the quarter-wave plate between the LCOS element and the wire grid the contrast is improved by correcting polarization errors which otherwise occur due to the lack of telecentricity of the field lens.

Systems of this type generally comprise many lens elements and are very complex in structure and so expensive to produce.

It is the object of the invention to provide a projection objective which with a small number of optical components and the smallest dimensions guarantees a high image quality and inexpensive production.

This object is achieved by the projection system according to claim 1 and the projector according to Claim 12. Preferred embodiments of the invention form the subject matter of the respective sub-claims.

The idea forming the basis of the invention is to construct the projection objective, starting from the side facing towards the projection wall, from a first group (G1) which comprises a negative meniscus, a second group (G2) which comprises a positive kit group or a positive lens, a third group (G3) which comprises a single lens with positive or negative refractive power, and a fourth group (G4) which comprises a positive lens and a field lens (FL) with positive refractive power.

The projection objective according to the invention for projecting light onto a projection surface that comprises: a first group (G1) with a negative meniscus, a second group (G2) with positive refractive power, a third group (G3) with a single lens, a fourth group (G4) with a lens with positive refractive power and a field lens (FL) with positive refractive power, the light passing through the projection objective from the fourth to the first group, is characterized in that the common focal width of the fourth group (G4) and the field lens (FL) is smaller than twice the image circle diameter of the projection objective, and the maximum free diameter is smaller than the overall focal width and in particular smaller than 0.8 times the overall focal width of the projection objective.

In preferred embodiments the projection objective according to the invention has as one or a number of further features that:
 the second group comprises a kit group;
 the second group comprises a single lens;
 all of the lenses are spherical;
 the field lens is made of a material with a low stress birefringence, in particular Pockelt glass;
 the focal width of the field lens is greater than three times the image circle diameter of the projection objective;
 the focal width of the fourth group is smaller than three times the image circle diameter of the projection objective;
 the common focal width of the fourth group and the field lens is smaller than the overall focal width of the projection objective;
 the maximum free diameter is smaller than one and a half times the image circle diameter of the projection objective;
 the overall focal width of the projection objective is smaller than one and a half times the distance between the fourth group and the field lens; and
 the distance between the fourth group and the field lens is substantially as great as the distance between the first group and the fourth group.

Correspondingly, the projector according to the invention for producing an image on a projection surface with an image transmitter for modulating light and a projection objective for projecting the modulated light onto the projection surface is characterized in that the projection objective is designed in the manner of one of the above embodiments.

In preferred embodiments the projector according to the invention has as one or a number of further features that:
 the image transmitter comprises LED illumination with a number of color channels, each color channel having at least one LED;
 each LED has a focusing element for reducing the angle range in which light is radiated by the LED;
 the focusing element comprises a lens system and/or a parabolic collection element;
 a color channel consolidation unit for consolidating the color channels behind the focusing element;
 the color channel consolidation unit comprises an x plate or an x cube;
 an illumination homogenization element for homogenizing the illumination of the image transmitter is provided;
 the illumination homogenization element is in the form of a honeycomb condenser;
 the illumination homogenization element is in the form of a parabolic collection element; and
 the image transmitter functions dependently upon polarization and a polarizer is disposed in front of the field lens.

The advantage of the projection objective according to the invention is that with it one can construct a compact projector and moreover the illumination of the image transmitter can also be compact in form. If LEDs are used as light sources, it is a further advantage that the latter have a very long life and are very efficient. A projection objective with a fixed focal width is thus provided which is suitable in particular for imaging reflective image modulation fields.

BRIEF DESCRIPTION OF THE DRAWINGS

Further features and advantages of the invention can be learnt from the following description of preferred embodiments where reference is made to the attached drawings.

BRIEF DESCRIPTION OF THE PREFERRED EMBODIMENTS

The drawings are not true to scale. The same elements, or elements with the same effect are provided with the same reference numbers unless stated to the contrary.

Figure 1:
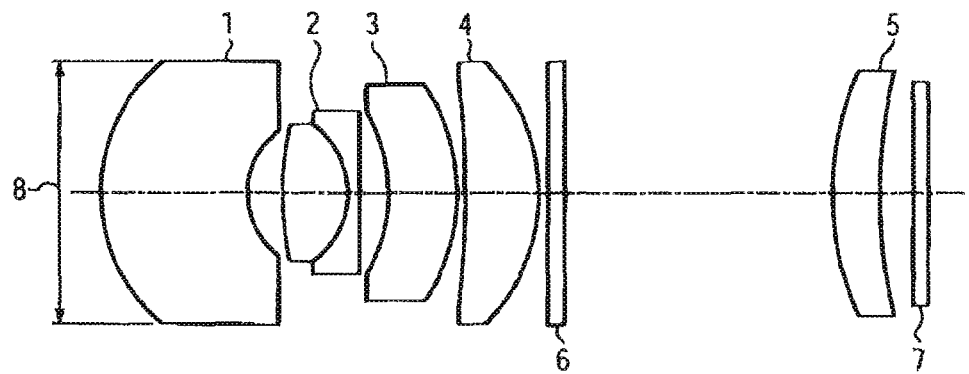
FIGS. 1 and 2 respectively show a first embodiment of the projection objective according to the invention with which in the second group an assembly and in the first and third group a lens element with aspherical surfaces is used.

FIG. 1 shows a first embodiment of the objective according to the invention. The objective is made up of four lens groups 1, 2, 3 and 4, the basic properties of which are described below. Moreover, a field lens 5 is a component part of the objective.

Basically, the objective according to the invention has the following properties: The first group 1 has a negative meniscus. The second group 2 has a positive refractive power. The third group 3 comprises a single lens. The fourth group 4 comprises a lens which has a positive refractive power. The field lens 5 also has a positive refractive power. Here the projected light passes through the projection objective from the field lens 5 via the fourth group 4 to the first group 1.

A polarization element 6 is provided between the fourth group 4 and the field lens 5. After the field lens 5, a glass path 7 is provided.

The optical properties of the fourth group 4 and of the field lens 5 are chosen such that their common focal width is smaller than twice the image circle diameter of the projection objective. At the same time the maximum free diameter of the objective, i.e. the aperture 8 of the objective, is smaller than the overall focal width. In particular, the maximum free diameter of the objective is smaller than 0.8 times the overall focal width of the projection objective.

According to the invention, the second group 2 has a positive refractive power. This can be achieved with a simple lens or, as shown in the embodiment in FIG. 1, with a so-called kit group which in the illustration in FIG. 1 is made up of a concave and a convex lens.

Moreover, with the first and third group 1 and 3 of this embodiment a lens element with aspherical surfaces is respectively used.

Figure 2:
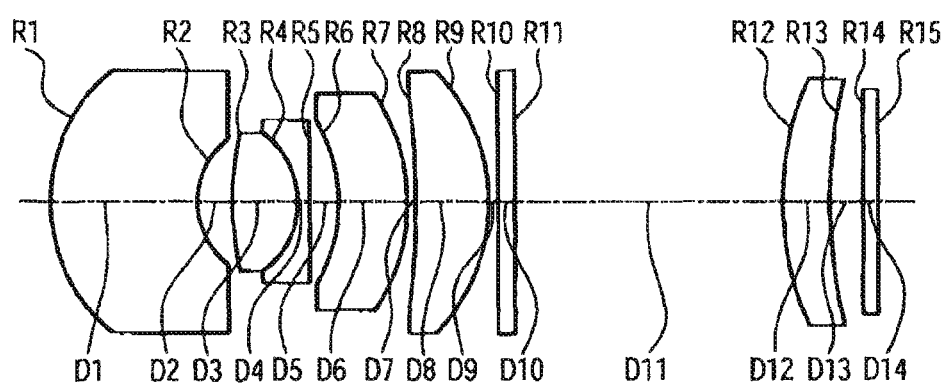

The optical data of the embodiment of the objective according to FIG. 1 are summarized in Table 1 which relates to the identification of the optical parameters of the objective in FIG. 2.

TABLE 1

| Radii | Thickness and air spacings | Refractive indices $n_d$ | Abbe number $v_d$ | Surface property |
|---|---|---|---|---|
| R1 = 8.050 | d0 = 900 | n1 = 1.63191 | v1 = 23.4 | A1 |
| R2 = 4.107 | D2 = 1.60 | n2 = 1.71300 | v2 = 53.9 | A2 |
| R3 = 27.608 | D3 = 2.76 | n3 = 1.63980 | v3 = 34.5 | A3 |
| R4 = −3.916 | D4 = 0.50 | n4 = 1.49176 | v4 = 57.4 | A4 |
| R5 = infinite | D5 = 1.37 | n5 = 1.61800 | v5 = 63.3 | |
| R6 = −5.820 | D6 = 2.97 | n6 = 1.51007 | v6 = 63.4 | |
| R7 = −7.270 | D7 = 0.36 | n7 = 1.84666 | v7 = 23.8 | |
| R8 = −48.560 | D8 = 3.40 | n8 = 1.51007 | v8 = 63.4 | |
| R9 = −8.547 | D9 = 0.50 | | | |
| R10 = infinite | D10 = 0.70 | | | |
| R11 = infinite | D11 = 12.15 | | | |
| R12 = 15.478 | D12 = 2.00 | | | |
| R13 = 26.070 | D13 = 1.50 | | | |
| R14 = infinite | D14 = 0.62 | | | |
| R15 = infinite | | | | |

| A1 | A2 | A3 | A4 |
|---|---|---|---|
| k = −1.2010E−02 | −6.4500E−04 | −2.9160E+00 | −8.7980E−02 |
| c2 = 6.7740E−05 | 1.0980E−04 | −1.4260E−03 | 2.5610E−04 |
| c3 = −4.5240E−06 | 6.5490E−05 | 4.4300E−05 | 3.5050E−06 |
| c4 = 2.2940E−07 | 2.9960E−06 | 3.2590E−06 | 5.5380E−07 |
| c5 = −3.2300E−09 | −7.2750E−09 | 5.2720E−09 | 1.6520E−09 |

Aspheric Equation:

$$z = (h^2/R)/(1+\text{RADICAL}(1-(1+k)*(h/R)^2)) + \text{SUM}\, c(i)*h^{**}si \quad i=2,3,4,5$$

Figure 3:
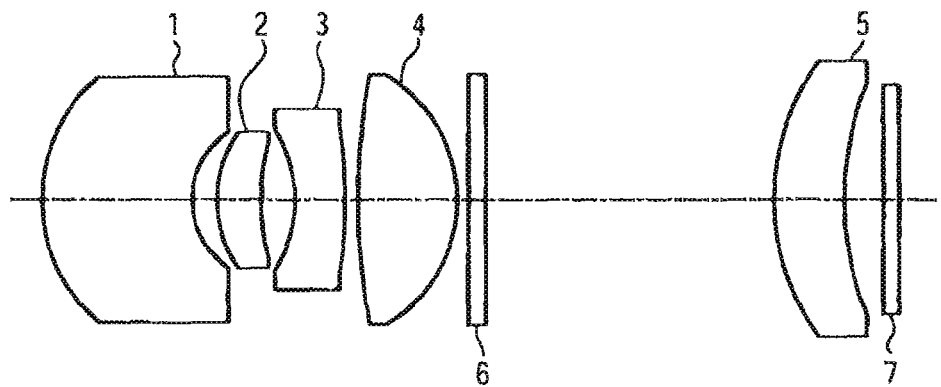
FIGS. 3 and 4 respectively show a further embodiment of the projection objective according to the invention with which in the first, second and third group a lens element with aspherical surfaces is respectively used.
Figure 4:
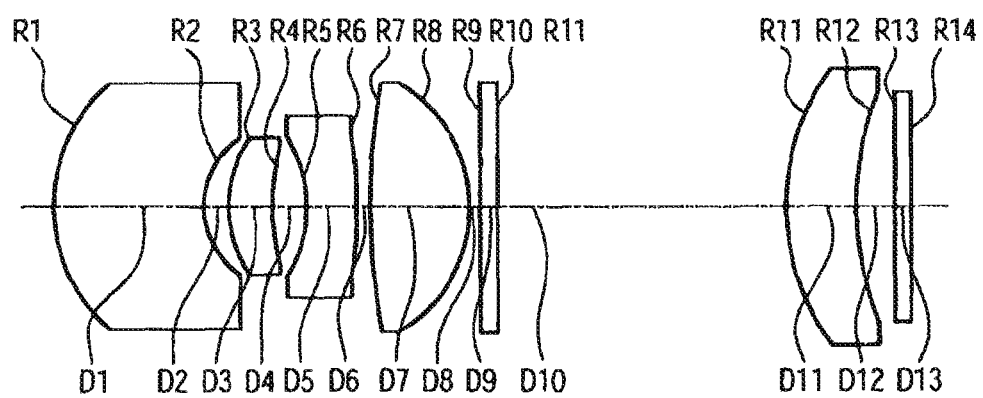

A second embodiment of the objective according to the invention is shown in FIGS. 3 and 4. With this embodiment, in the first, second and third group 1, 2 and 3, a lens element with aspherical surfaces is respectively used. This means in particular that in the second group 2 the positive refractive power is achieved with a (simple) lens and not, as in FIG. 1, with a kit group. Moreover, the embodiment according to FIG. 3 has the same basic structure as the embodiment according to FIG. 1.

The optical data of the embodiment of the objective according to FIG. 3 is summarized in Table 2 which relates to the identification of the optical parameters of the objective in FIG. 4.

TABLE 2

| Radii | Thickness and air spacings | Refractive indices nd | Abbe number vd | Surface property |
|---|---|---|---|---|
| R1 = 8.225 | d0 = 900 | n1 = 1.63191 | v1 = 23.4 | A1 |
| R2 = 3.794 | d1 = 6.31 | n2 = 1.80610 | v2 = 40.9 | A2 |
| R3 = 6.680 | d2 = 1.07 | n3 = 1.63191 | v3 = 23.4 | A3 |
| R4 = 11.980 | d3 = 1.84 | n4 = 1.49700 | v4 = 81.5 | A4 |
| R5 = −5.463 | d4 = 1.40 | n5 = 1.51007 | v5 = 63.4 | A5 |
| R6 = −10.814 | d5 = 2.18 | n6 = 1.84666 | v6 = 23.8 | A6 |
| R7 = 33.930 | d6 = 0.47 | n7 = 1.51007 | v7 = 63.4 | |
| R8 = −6.390 | d7 = 4.23 | | | |
| R9 = infinite | d8 = 0.50 | | | |
| R10 = infinite | d9 = 0.70 | | | |
| R11 = 11.070 | d10 = 12.47 | | | |
| R12 = 16.070 | d11 = 3.00 | | | |
| R13 = infinite | d12 = 1.60 | | | |
| R14 = infinite | d13 = 0.62 | | | |

| | A1 | A2 | A3 | A4 | A5 | A6 |
|---|---|---|---|---|---|---|
| K = | −1.1130E−03 | −8.3210E−02 | −1.5180E−02 | −4.3140E−02 | −2.9450E+00 | −1.5030E−01 |
| C2 = | 4.0000E−05 | 1.1460E−04 | −3.5290E−04 | −1.9260E−94 | −1.2710E−03 | 1.0670E−03 |
| C3 = | 6.2610E−07 | 6.6850E−05 | 2.0230E−06 | −2.3140E−05 | 7.1050E−05 | 3.3140E−05 |
| C4 = | 3.1470E−08 | 2.5890E−06 | 5.1670E−07 | −1.8680E−08 | 3.0700E−06 | 5.4250E−07 |
| C5 = | −2.8810E−10 | −5.9000E−08 | 2.9440E−08 | −6.8770E−08 | −1.6890E−07 | 2.8300E−08 |

Aspheric Equation:

$$z(h^2/R)/(1+\text{RADICAL}(1-(1+k)*(h/R)^2))+\text{SUM}c(i)*h^{**}2i \; i \; 2,3,4,5$$

Figure 5:
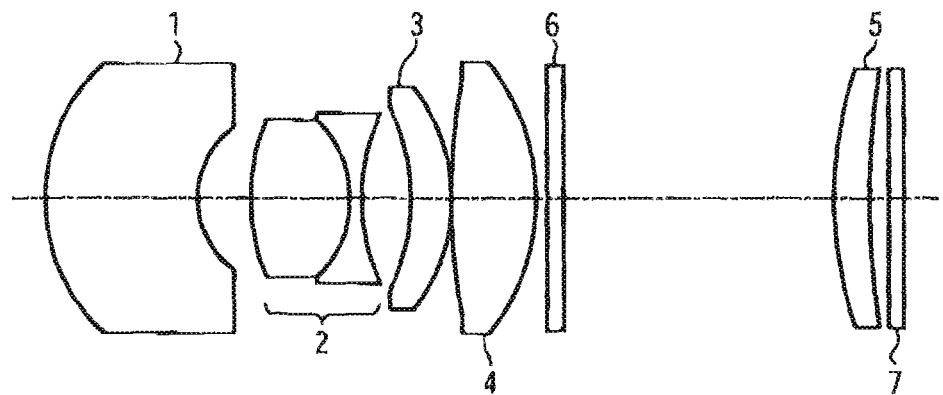
FIGS. 5 and 6 respectively show a further embodiment of the projection objective according to the invention with which in the second group an assembly and in the first and third group a lens element with spherical surfaces is used.

Finally, FIG. 5 shows an embodiment of the projection objective according to the invention with which in the second group an assembly and in the first and third group a lens element with spherical surfaces is used.

The advantage of this embodiment is obvious because here spherical surfaces, which are easier to produce, are used. Furthermore, this embodiment manages with the same number of lenses as the embodiment according to FIG. 1.

Figure 6:
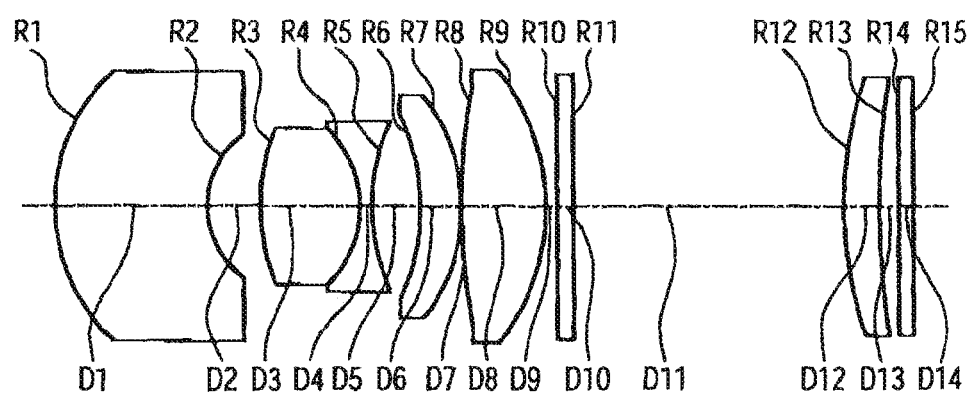

The optical data of this embodiment of the objective are summarized in Table 3 which relates to the identification of the optical parameters of the objective in FIG. 6.

All three embodiments of the projection objective meet the following conditions:

$$f_{FL}/B\emptyset > 3.0 \quad \quad 1)$$

$$f_{G4}/B\emptyset < 3.0 \quad \quad 2)$$

$$f_{G4+FL}/B\emptyset < 2.0 \quad \quad 3)$$

$$f_{G4+FL}/f < 1.0 \quad \quad 4)$$

$$\emptyset_{fr(max)}/B\emptyset < 1.5 \quad \quad 5)$$

$$\emptyset_{fr(max)}/f < 0.8 \quad \quad 6)$$

$$f/d_{G4-FL} < 1.5 \quad \quad 7)$$

wherein the symbols signify as follows:
f—overall focal width of the system
$f_{G4}$—focal width of the fourth group
$f_{FL}$—focal width of the field lens
$f_{G4+FL}$—focal width of the fourth group and field lens
$\emptyset_{fr(max)}$—maximum free diameter of the system
$d_{GS-FL}$—distance between fourth lens group and field lens
B∅—image circle diameter of the system.

TABLE 3

| Radii | Thickness and air spacings | Refractive indices nd | Abbe number vd | Surface property |
|---|---|---|---|---|
| R1 = 9.10 | d0 = 900 | n1 = 1.84666 | v1 = 23.8 | |
| R2 = 4.230 | d1 = 6.81 | n2 = 1.69350 | v2 = 50.8 | |
| R3 = 11.06 | d2 = 2.413 | n3 = 1.59270 | v3 = 35.3 | |
| R4 = −4.77 | d3 = 4.55 | n4 = 1.65160 | v4 = 58.6 | |
| R5 = 9.67 | d4 = 0.54 | n5 = 1.61800 | v5 = 63.3 | |
| R6 = −9.70 | d5 = 2.38 | n6 = 1.51007 | v6 = 63.4 | |
| R7 = −8.26 | d6 = 1.81 | n7 = 1.84666 | v7 = 23.8 | |
| R8 = 54.790 | d7 = 0.10 | n8 = 1.51007 | v8 = 63.4 | |
| R9 = −10.34 | d8 = 3.79 | | | |
| R10 = infinite | d9 = 0.50 | | | |
| R11 = infinite | d10 = 0.70 | | | |
| R12 = 20.890 | d11 = 12.41 | | | |
| R13 = 48.920 | d12 = 1.60 | | | |
| R14 = infinite | d13 = 0.80 | | | |
| R15 = infinite | d14 = 0.62 | | | |

Upon the basis of these properties of the projection objective according to the invention, with each of the three embodiments of the objective described above a compact projector managing with just a few elements can be constructed, as will be explained below by means of FIG. 7.

Figure 7:
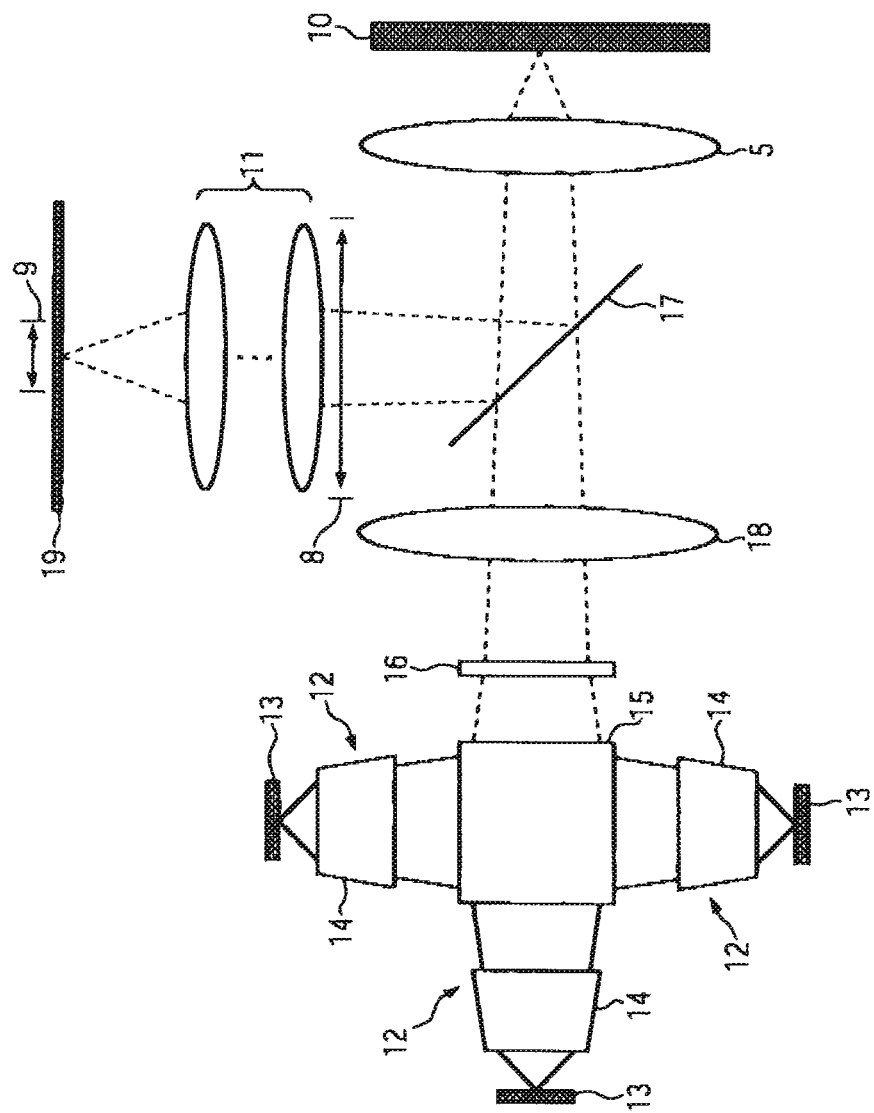
FIG. 7 diagrammatically shows an illumination arrangement for a projector with a projection objective according to the invention.

The projector according to FIG. 7 is designed with three color channels 12. These color channels 12 respectively have as a light source at least one LED 13, the light of which is respectively collimated in a focusing element 14. This focusing element 14 can in particular consist of a lens system comprising one or more lenses (spherical or aspherical) or be in the form of a "compound parabolic concentrator" (CPC).

In one color channel consolidation unit 15, the three color channels 12 are superimposed so that a common light channel is produced. The color channel consolidation unit 15 preferably consists of a so-called x plate or an x cube. Whereas the three color channels 12 are illustrated by thin continuous lines, the common light channel is shown by dashes.

Adjoining the color channel consolidation unit 15 is an illumination homogenization element 16 and a further lens system 18 for illumination of the objective 11 and of the image transmitter 10. The element 16 serves to homogenize the illumination and is preferably in the form of a honeycomb condenser. With the field lens 5, the lens system 18 following the illumination homogenization element 16 completes the imaging of the LED onto the image transmitter 10.

The light from the image transmitter 10 charged with image information passes through the field lens 5 and is guided by the polarizer 17 into the objective 11.

The objective 11 corresponds to one of the three embodiments according to FIG. 1, 3 or 6. It has a maximum free diameter $\varnothing_{fr(max)}$ 8 which in the ideal case is fully used and is imaged onto a projection plane 19. An image circle diameter B$\varnothing$ 9 of the objective is produced on the projection plane 19.

In FIG. 7 the field lens 5 is shown separately from the objective 11. It is a greater distance $d_{G4-FL}$ away from the initial group 4 of the objective 11. By means of the large distance between the fourth group 4 of the objective 11 and the field lens 5 one creates the possibility of locating a deflection, an illumination coupling or a polarization element 17 at this point in the optical path.

The field lens 5 preferably has a positive refractive power so that more compact illumination optics with a smaller diameter in comparison with projection systems without a field lens are possible. Moreover, with projection optics with image transmitters 10 the connection of which is based upon polarization effects, the field lens 5 is preferably made of material with low stress birefringence, in particular Pockelt glass (SF57).

A summary of the three embodiments of the objective according to the invention described is given in Table 4.

TABLE 4

| Exemplary embodiment | Table 1 | Table 2 | Table 3 |
|---|---|---|---|
| Focal width fourth group (G4) | 16.19 | 11.18 | 14.34 |
| Focal width of the field lens (FL) | 40.99 | 32.60 | 41.55 |
| Overall calorific value f | 17.07 | 16.99 | 17.29 |
| Focal width (G4) + (FL) | 14.45 | 11.15 | 13.93 |
| Distance (G4) − (FL) | 13.35 | 13.67 | 13.61 |
| Image circle Ø | 9.40 | 9.40 | 9.40 |
| Maximum free Ø | 11.38 | 10.90 | 12.05 |
| Focal width field lens (FL)/image circle Ø | 4.36 | 3.47 | 4.42 |
| Focal width fourth group (G4)/image circle Ø | 1.72 | 1.19 | 1.53 |
| Focal width (G4) + (FL)/image circle Ø | 1.54 | 1.19 | 1.48 |
| Focal width (G4) + (FL)/overall focal width | 0.95 | 0.66 | 0.83 |
| Maximum free Ø/image circle Ø | 1.21 | 1.16 | 1.28 |
| Maximum free Ø/overall focal width | 0.667 | 0.642 | 0.697 |
| Overall focal width/distance (G4) − (FL) | 1.279 | 1.243 | 1.271 |

REFERENCE NUMBERS 1. first group (G1) with a negative meniscus
2. second group (G2) with positive refractive power
3. third group (G3) with a single lens
4. fourth group (G4) with lens with positive refractive power
5. field lens (FL) with positive refractive power
6. polarization element
7. glass path
8. maximum free diameter of the projection objective $\varnothing_{fr(max)}$
9. image circle diameter of the projection objective BØ
10. image transmitter for modulating light
11. projection objective for projection onto the projection surface
12. color channel
13. LED illumination
14. focusing element of LED
15. color channel consolidation unit for color channels
16. illumination homogenization element for illumination image transmitter
17. polarizer
18. lens system
19. projection plane

The invention claimed is:

1. A projection objective for projecting light onto a projection surface that comprises:
    an imager;
    a first group with a negative meniscus;
    a second group with positive refractive power;
    a third group with a single lens;
    a fourth group with a lens with positive refractive power, and a field lens with positive refractive power, such that the light passes through the projection objective from the fourth to the first group;
    wherein the common focal length of the fourth group and the field lens is smaller than twice the image circle diameter of the projection objective;
    wherein the maximum free diameter is smaller than the overall focal length and in particular smaller than approximately 0.8 times the overall focal length of the projection objective; and
    wherein the field lens is positioned a substantially short distance from the imager, such that the distance is less than a fifth of the overall focal length of the projection objective.

2. The projection objective according to claim 1, wherein the second group comprises a kit group.

3. The projection objective according to claim 1, wherein the second group comprises a single lens.

4. The projection objective according claim 1, wherein all of the lenses are spherical.

5. The projection objective according to claim 1, wherein the focal length of the field lens is greater than three times the image circle diameter of the projection objective.

6. The projection objective according to claim 1, wherein the focal length of the fourth group is smaller than three times the image circle diameter of the projection objective.

7. The projection objective according to claim 1, wherein the common focal length of the fourth group and the field lens is smaller than the overall focal length of the projection objective.

8. The projection objective according to claim 1, wherein the maximum free diameter is smaller than one and a half times the image circle diameter of the projection objective.

9. The projection objective according to claim 1, wherein the overall focal length of the projection objective is smaller than one and a half times the distance between the fourth group and the field lens.

10. The projection objective according to claim 1, wherein the distance between the fourth group and the field lens is as great as the distance between the first group and the fourth group.

11. A projector for producing an image on a projection surface with a light source comprising:
    an image transmitter for modulating light; and
    a projection objective for projecting the light from the light source onto the image transmitter;
    wherein the projection objective comprises:
    a first group with a negative meniscus;
    a second group with positive refractive power;
    a third group with a single lens; a fourth group with a lens with positive refractive power, and a field lens with positive refractive power, such that the light passes through the projection objective from the fourth to the first group;

wherein the common focal length of the fourth group and the field lens is smaller than twice the image circle diameter of the projection objective;

wherein the maximum free diameter is smaller than the overall focal length and in particular smaller than approximately 0.8 times the overall focal length of the projection objective; and wherein the field lens is positioned at substantially one fifth of the overall focal length of the projection objective from the image transmitter.

12. The projector according to claim 11, wherein the light source comprises a number of color channels, each color channel having at least one LED.

13. The projector according to claim 12, wherein each LED is provided with a focusing element for reducing the angle range in which light is radiated by the LED.

14. The projector according to claim 13, wherein the focusing element comprises a lens system or a parabolic collection element.

15. The projector according to claim 11 further comprising a color channel consolidation unit for consolidating the color channels.

16. The projector according to claim 15, wherein the color channel consolidation unit comprises an x plate or an x cube.

17. The projector according to claim 11 further comprising an illumination homogenization element for homogenizing the illumination.

18. The projector according to claim 17, wherein the illumination homogenization element is in the form of a honeycomb condenser.

19. The projector according to claim 17, wherein the illumination homogenization element is in the form of a parabolic collection element.

20. The projector according to claim 11, wherein the image transmitter functions dependently upon polarization and the polarizer is disposed in front of the field lens.

* * * * *